United States Patent
Hamlaoui et al.

(10) Patent No.: US 12,386,202 B2
(45) Date of Patent: Aug. 12, 2025

(54) THREE-STATE OPTICAL ARTICLE AND METHOD FOR CONTROLLING SAME

(71) Applicant: Essilor International, Charenton-le-Pont (FR)

(72) Inventors: Samy Hamlaoui, Charenton le Pont (FR); Sylvain Chene, Charenton le Pont (FR); Bruno Fermigier, Charenton le Pont (FR)

(73) Assignee: Essilor International, Charenton-le-Pont (FR)

( * ) Notice: Subject to any disclaimer, the term of this patent is extended or adjusted under 35 U.S.C. 154(b) by 281 days.

(21) Appl. No.: 17/317,206

(22) Filed: May 11, 2021

(65) Prior Publication Data
US 2021/0356768 A1     Nov. 18, 2021

(30) Foreign Application Priority Data
May 13, 2020 (EP) ..................................... 20305494

(51) Int. Cl.
*G02C 7/08* (2006.01)

(52) U.S. Cl.
CPC .................................... *G02C 7/085* (2013.01)

(58) Field of Classification Search
CPC . G02C 7/00; G02C 7/085; G02C 7/08; G02C 7/02; G02C 7/088; G02B 26/004; G02B 3/12; G02B 3/14; G02B 5/00; G02B 5/005; G02B 1/06
See application file for complete search history.

(56) References Cited

U.S. PATENT DOCUMENTS

| | | | |
|---|---|---|---|
| 7,475,984 B2 * | 1/2009 | Blum | G02F 1/133553 351/159.41 |
| 2003/0095336 A1 | 5/2003 | Floyd | |
| 2007/0211207 A1 * | 9/2007 | Lo | G02B 26/005 359/666 |

(Continued)

FOREIGN PATENT DOCUMENTS

| | | |
|---|---|---|
| CN | 101069106 A | 11/2007 |
| CN | 101796436 A | 8/2010 |

(Continued)

OTHER PUBLICATIONS

Walline, Jeffrey J. "Myopia control: a review." Eye & contact lens 42.1 (2016): 3-8 (Year: 2016).*

(Continued)

*Primary Examiner* — Thomas K Pham
*Assistant Examiner* — Justin W. Hustoft
(74) *Attorney, Agent, or Firm* — NIXON & VANDERHYE

(57) ABSTRACT

The disclosure relates to an optical article which comprises a hollow chamber and a separator separating the hollow chamber into a first subspace and a second subspace.
The separator comprises an aperture.
The optical article comprises a deformable membrane, attached, in the second subspace, along a closed line surrounding the aperture.
The optical article is switchable, by deformation of the membrane, between at least three states (ST1, ST2, ST3). Each state corresponds to a different optical function.
The disclosure also comprises a corresponding method for switching said optical article between at least two of the three states.

20 Claims, 5 Drawing Sheets

-ST1-

(56) References Cited

U.S. PATENT DOCUMENTS

| | | |
|---|---|---|
| 2009/0180198 A1 | 7/2009 | Lee et al. |
| 2009/0195882 A1 | 8/2009 | Bolle et al. |
| 2010/0039709 A1 | 2/2010 | Lo |
| 2010/0110560 A1 | 5/2010 | Cho |
| 2010/0202054 A1* | 8/2010 | Niederer ............... G02B 3/14 |
| | | 359/666 |
| 2010/0208194 A1 | 8/2010 | Gupta |
| 2012/0092775 A1 | 4/2012 | Duston et al. |
| 2016/0274278 A1 | 9/2016 | Chao |
| 2018/0210232 A1 | 7/2018 | Boutinon |
| 2019/0227346 A1 | 7/2019 | Berge |
| 2019/0377172 A1* | 12/2019 | Karam ............... G02B 26/005 |

FOREIGN PATENT DOCUMENTS

| | | |
|---|---|---|
| CN | 102317839 A | 1/2012 |
| CN | 102656484 A | 9/2012 |
| CN | 107923998 A | 4/2018 |
| EP | 2 184 625 | 5/2010 |
| EP | 2 995 976 | 3/2016 |
| WO | 2006/011937 | 2/2006 |
| WO | 2009021344 A1 | 2/2009 |
| WO | 2010093751 A1 | 8/2010 |
| WO | 2011046959 A1 | 4/2011 |
| WO | 2013/046934 | 4/2013 |

OTHER PUBLICATIONS

Extended European Search Report for EP 20305494.5 dated Oct. 22, 2020, 7 pages.
Office Action, issued in Chinese Patent Application No. 202110521716.6 dated Apr. 26, 2024.

* cited by examiner

-ST1-

-ST2-

THREE-STATE OPTICAL ARTICLE AND METHOD FOR CONTROLLING SAME

CROSS-REFERENCE TO RELATED APPLICATIONS

This application claims priority to EP 20305494.5 filed May 13, 2020, the entire contents of which is hereby incorporated by reference.

FIELD OF THE INVENTION

The present invention relates in general to optical articles such as eyewear or eyewear components and to methods for switching such optical articles.

BACKGROUND OF THE INVENTION

Some known optical lenses may provide a variable lens power using a deformable membrane that separates two liquids having different refractive indices.

One difficulty with these known optical lenses is that a compromise is required between providing a large field of view and providing a large power modification range.

Document WO2006011937 describes an example of an optical lens.

The amplitude of the allowable power variation over a large field is limited by the amplitude of the allowable deformation of the membrane, thus to the thickness of the optical lens. In this example, the difference of refractive index between the 2 liquids is limited to about 0.1 or 0.2. For this reason, an optical power variation such as over a range of 3 diopters over a full lens field is unattainable in practice.

Such an optical lens may only be applicable to provide small power changes over a full lens field.

The potential use of such an optical lens is to provide, to a limited extent, an adapted optical power in a far vision situation to provide a correction adapted to an evolutive myopia. However, such an optical lens cannot provide a variable optical power in a near vision situation to correct an evolutive hyperopia or presbyopia.

Document US 2019227346 describes another example of optical lens.

A larger optical power variation, such as over a range of 3 diopters, may be achievable, but since the allowable width of the deformation of the membrane is limited by the thickness of the optical lens, such an optical power variation may only be provided over a part of the lens field. The potential use of such an optical lens is to provide a variable optical power over a limited field of view in a near vision situation to correct an evolutive hyperopia or presbyopia. However, such an optical lens cannot provide an adapted optical power over a large field of view, thus cannot provide a correction adapted to an evolutive myopia.

In this context, there is a need for an improved optical lens that may not only provide a power variation across a large field of view but also provide a large range of power variation.

Such an optical lens shall also remain structurally simple.

SUMMARY OF THE INVENTION

Embodiments of the invention provide an optical article comprising:
a hollow chamber delimited by an outer wall,
a separator extending from the outer wall inwards, comprising a first side facing a first surface of the outer wall and a second side facing a second surface of the outer wall, the separator separating the hollow chamber into a first subspace and a second subspace,
wherein the separator comprises an aperture,
the optical article comprises a deformable membrane, attached, in the second subspace, along a closed line surrounding the aperture, the deformable membrane separating the hollow chamber into a first cavity extending towards the first surface of the outer wall and a second cavity extending towards the second surface of the outer wall,
the optical article is switchable, by deformation of the membrane, between at least three states, and
the first cavity being filled with a first fluid having a first optical property and the second cavity being filled with a second fluid having a second optical property, the optical article has a different optical function for each of the at least three states.

Embodiments of the invention further provide a method for switching an optical function of an optical article comprising:
a hollow chamber delimited by an outer wall,
a separator extending from the outer wall inwards, comprising a first side facing a first surface of the outer wall and a second side facing a second surface of the outer wall, the separator separating the hollow chamber into a first subspace and a second subspace, the separator comprising a central aperture,
a deformable membrane, attached to a peripheral area in the second subspace, the deformable membrane separating the hollow chamber into a first cavity extending towards the first surface of the outer wall and a second cavity extending towards the second surface of the outer wall,
the optical article having an active optical function which is switchable, by deformation of the membrane, between at least three states,
the method comprising switching the optical function of the optical article between two of the at least three states by deforming the membrane.

By "a closed line surrounding the aperture" is understood a closed line delimiting a closed surface of the outer wall and/or of the separator, the closed surface forming an area greater than the aperture and fully covering the aperture.

By "fluid" is understood any liquid or gas. By selecting fluids having refractive indices close to the refractive indices of the materials forming the separator, the membrane and the hollow chamber, light reflections may be minimized The expressions "optical function" and "optical property" may respectively include in particular a dioptric function and a refraction index.

For example, the first fluid and the second fluid may have different refraction indices, then the optical article has a different dioptric function for each of the at least three states.

It is thus possible, using such an optical article or performing such a method, to provide an optical function which is variable between at least three states in a simple and efficient way. Indeed, it is possible, by deforming the membrane, to switch from a first state to a second state so as to provide for example a variation of optical power across a large field of view, and to switch from the first state to the third state so as to provide for example a larger variation of optical power across a narrower field of view.

This is achieved by the specific configuration of the optical article, in particular of the separator and of the membrane, to permit a different membrane deformation in both directions. In a first direction, the membrane only may be deformed in a limited area delimited by the aperture while in the second direction the membrane may be deformed over a larger area encompassing the aperture.

The expressions "optical function" and "optical property" may respectively include in particular a transmission function and a visible light absorption spectrum.

For example, the first fluid and the second fluid may have different visible light absorption spectra, then the optical article has a different transmission function and a different tint for each of the at least three states.

Of course, the first fluid and the second fluid may also have both different refraction indices and different visible light absorption spectra.

In an example, the separator is non-deformable.

In this example, the deformation of the membrane is limited by the shape of the separator. The shape of the separator may be selected for example such that if the membrane is held against the separator and both cavities are filled with a different fluid the resulting optical function of the optical article is predefined. For example, the resulting optical power may then be equal to a predetermined prescription value.

In an example, the outer wall is non-deformable.

In this example, the deformation of the membrane is limited by the shape of the hollow chamber. The shape of the hollow chamber may be selected for example such that if the membrane is held against the outer wall of the hollow chamber and both cavities are filled with a different fluid, the resulting optical function of the optical article is predefined. For example, the resulting optical power may then be equal to a predetermined value suitable for correcting a defect of an eye of a user during, for example, a far distance activity.

When both the outer wall and the separator are non-deformable, the deformation of the membrane is the single controllable parameter for switching the optical article between different states.

In an example, the outer wall comprises a fluid inlet linked to the first subspace for adjusting an amount of fluid inside the first cavity to deform the membrane to switch the active optical function from one state to another.

In an example, the outer wall comprises a fluid inlet linked to the second subspace for adjusting an amount of fluid inside the second cavity to deform the membrane to switch the active optical function from one state to another.

In general, the deformation of the membrane may be controllable by adjusting:
an amount of fluid in either cavity, or
amounts of fluids in both cavities, or
a difference of pressure in both cavities.

The following examples illustrate different possible states of the optical article. Each of these exemplary states corresponds to a specific position of the deformable membrane, resulting in specific shapes of the first cavity and of the second cavity.

In an example, in a first state the deformable membrane is pressed against the separator such that the first cavity extends throughout the first subspace while the second cavity extends throughout the second subspace.

In this example, the first state may be considered as a default, or reference, state. When both cavities are filled with a fluid having a different optical property, the optical article provides a reference optical function. The reference optical function is related to the shape of the separator, which may be planar, spherical, toroidal, freeform, etc. depending on the particular needs of a user. For example, the reference optical function may be based on a prescription value of the user. For example, the reference optical function may be adapted to the user for an intermediate distance vision activity.

In an example, in a second state the deformable membrane protrudes through the aperture such that the second cavity extends to part of the first subspace.

In this example, the second state may be considered as a state for a specific use, such as for near vision activities.

For example, the deformable membrane may be pressed against the separator, as in the first state, with the exception that the membrane protrudes through the aperture.

In this example, when both cavities are filled with a fluid having a different optical property, the optical article provides the reference optical function over most of the full field, that is, over the separator excluding over the aperture. In addition, the optical article provides a specific optical function over a narrow part of the full field, that is, over the aperture.

For example, the shape and section of the aperture, along with the width of the protrusion over the aperture may be chosen to provide, over the aperture, a specific optical function adapted to a near vision activity.

For example, the position of the aperture in the separator may be chosen to correspond to an area of the optical article corresponding to a range of lowering gaze angles which is best adapted for correcting an ametropia during a near vision activity.

In an example, in a third state at least part of the deformable membrane is lifted off the separator such that the first cavity extends to at least part of the second subspace.

In this example, when both cavities are filled with a fluid having a different optical property, the optical article provides a specific optical function, which is different from the reference optical function, over an area delimited by the closed line the membrane is attached to.

The combination of the first, second and third exemplary states above allows the optical article to provide an optical power variation throughout a first range over a full field, and also to provide an optical power variation throughout a second range greater than the first range, over a narrower field.

In an example, the at least part of the deformable membrane has an area larger than the aperture.

Since the section of the aperture is narrower than the surface delimited by the closed line the deformable membrane is attached to, the deformable membrane may be deformed across the narrow section of the aperture, and may also be deformed across the greater surface of the area delimited by said closed line.

In an example, in the third state at least part of the deformable membrane is pressed against the second surface of the outer wall.

The first surface of the outer wall is a depth stop to the allowable extent of the deformation of the membrane. The shape of the first surface of the outer wall may be chosen so that the optical article provides a specific optical function in the third state. For example, said specific optical function may be adapted for correcting an ametropia during a far vision activity.

In an example, the aperture has a circular section.

Therefore, in the second state, the protrusion of the membrane through the aperture is spherical and does not induce any optical aberrations.

Of course, the section of the aperture may alternatively be chosen to be non-circular, in order to induce an optical aberration to specifically correct a specific type of ametropia.

In an example, the optical article is an optical lens comprising a front shell and a back shell and the hollow chamber is formed between the front shell and the back shell.

For example, the front shell and the back shell each comprise an external surface on the outside of the optical lens and an internal surface on the inside of the optical lens. The internal surfaces form part of the outer wall of the hollow chamber.

For example, in the third state at least part of the deformable membrane may be pressed against the internal surface of the front shell and in the second state the deformable membrane may protrude through the aperture, facing towards the internal surface of the back shell.

For example, in the third state at least part of the deformable membrane may be pressed against the internal surface of the back shell and in the second state the deformable membrane may protrude through the aperture, facing towards the internal surface of the front shell.

In an example, the first cavity being filled with a first fluid and the second cavity being filled with a second fluid, the optical article has a first optical power P1 in the first state and a second optical power P2 in the second state with P2−P1 having an absolute value greater than 0.25 diopters.

In an example, the first cavity being filled with a first fluid and the second cavity being filled with a second fluid, the optical article has a first optical power P1 in the first state and a third optical power P3 in the third state with P3-P1 having an absolute value greater than 0.25 diopters.

0.25 diopters is the usual measurement step used by optometrists to determine a refractive error of the eye and is accordingly also the usual increment of optical power correction that may be provided to a user.

In an embodiment, the separator comprises a plurality of apertures and the membrane is attached, in the second subspace, across a closed shape surrounding the plurality of apertures.

The plurality of apertures may be designed, in terms of respective shapes, sections and/or positions so as to form a plurality of microlenses when the membrane is deformed to protrude through the plurality of apertures.

Microlenses are known to be beneficial in particular for children having an evolutive myopia.

For example, the optical article may be configured so that:
by switching the optical article between a first and a second state, an evolutive ametropia in far vision may be corrected in full field, and
by switching the optical article between the first state and a third state in which microlenses are activated by deformation of the membrane, an evolutive ametropia in near vision may be corrected.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

Figure 1:
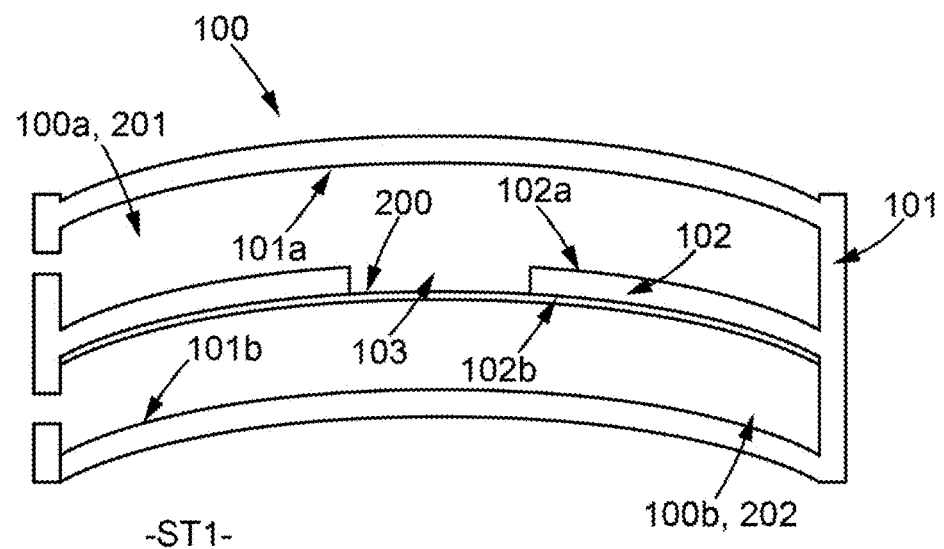
FIGS. 1, 2 and 3 depict three example states of a first example of optical equipment.

In the description which follows the drawing figures are not necessarily to scale and certain features may be shown in generalized or schematic form in the interest of clarity and conciseness or for informational purposes. In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a system and conversely, all the technical features relative to a system can be transposed, individually or in combination, to a process.

It is now referred to FIG. 1, which depicts an example of an optical lens, such as a spectacle optical lens that may be mounted on a spectacle frame.

The optical lens comprises a front lens shell and a back lens shell.

The front lens shell and the back lens shell each comprise a front surface intended to face a visual scene and a back surface intended to face an eye of a wearer.

The front shell and the back shell may be both mounted on a supporting element on the side of the optical lens. Alternately, the front shell and the back shell may each extend to the side of the lens and comprise side elements configured to cooperate with each other.

The optical lens comprises a hollow chamber (100) delimited by an outer wall (101) formed in particular by the front surface of the back shell and the back surface of the front shell.

In the example illustrated in FIG. 1, the back surface of the front shell may be viewed as a first surface (101*a*) of the outer wall (101) and the front surface of the back shell as a second surface (101*b*) of the outer wall (101).

The optical lens further comprises a separator (102). The separator (102) extends from a side of the outer wall (101) inwards.

The separator (102) separates the hollow chamber (100) into a first subspace (100*a*) and a second subspace (100*b*). The separator comprises a first side (102*a*) and a second side (102*b*). The first subspace (100*a*) is delimited by the first side (102*a*) of the separator (102) and by the first surface (101*a*) of the outer wall (101). The second subspace (100*b*) is delimited by the second side (102*b*) of the separator (102) and by the second surface (101*b*) of the outer wall (101).

The separator (102) comprises at least one aperture (103), possibly a plurality of apertures (103), each aperture being a channel between the first subspace (100*a*) and the second subspace (100*b*).

The optical lens further comprises a deformable membrane (200), in other words a thin piece of material which may be controllably deformed.

The membrane (200) is attached, in the second subspace (100b) along a closed line surrounding the aperture (103). For example, the closed line may be formed on the second side (102b) of the separator (102) and delimit an area greater than the aperture (103) and fully covering the aperture (103). For example, the closed line may extend along the side of the optical lens, over the full circumference of the optical lens, and delimit an area corresponding to the full lens field.

On the exemplary optical lens depicted in FIG. 1, the membrane (200) is attached in the second subspace (100b) which extends from the separator (102) to the back lens shell.

Of course, on another exemplary optical lens (not represented), this configuration may be reversed and the membrane (200) be attached in a first subspace (100a) which extends from the separator (102) to the front lens shell, while a second subspace (100b) extends from the separator (102) to the back lens shell.

The membrane (200) separates the hollow chamber (100) into a first cavity (201) and a second cavity (202).

The optical article may be configured so that a given fluid initially located in the first cavity (201) cannot be displaced towards the second cavity (202) and vice versa. In particular, the deformable membrane, the separator, the front shell and the back shell are all impermeable at least to liquids, and possibly impermeable to fluids.

The outer wall (101) may comprise a fluid inlet as a channel between one of the first cavity and the second cavity, on the one hand, and the outside of the hollow chamber, on the other hand. The fluid inlet may be coupled to a fluid tank, such that a fluid can be controllably displaced between the fluid tank to said cavity and vice versa.

The outer wall (101) may comprise:
a first fluid inlet as a first channel between the first cavity and the outside of the hollow chamber, and
a second fluid inlet as a second channel between the second cavity and the outside of the hollow chamber.

Each fluid inlet may be coupled to a corresponding fluid tank, such that a fluid (which may be a liquid or a gas) can be controllably displaced between a fluid tank to the corresponding cavity and vice versa.

For example, the optical lens may be a spectacle lens mounted on a spectacle frame, the fluid inlet may be located on the side of the spectacle lens, may cooperate with a corresponding hole in a peripheral holder, towards an arm of the spectacle frame, and the fluid tank may be coupled with said corresponding hole and be for example located on, or enclosed in, said arm of the spectacle frame.

The optical article is switchable, by deformation of the membrane (200) between at least three configurations or states (ST1, ST2, ST3).

The different configurations or states differ from each other in the position and shape of the membrane (200) with respect to the separator (102) and to the outer wall (101). Each of these different positions and shapes results in a specific partition of the hollow chamber (100) into the first cavity (201) and the second cavity (202). In other words, for each state or configuration of the optical lens, the first cavity (201) has a corresponding first shape and a corresponding first volume, and the second cavity (202) has a corresponding second shape and a corresponding second volume.

As illustrated in FIG. 1, the optical article may be set in a first state (ST1) in which the membrane (200) is maintained against the separator (102) on its whole surface. In other words, in the first state (ST1), the first subspace (100a) coincides with the first cavity (201) and the second subspace (100b) coincides with the second cavity (202).

In an example, the front lens shell, the back lens shell and the separator (102) may each be made of a material that is mostly transparent to visible light. Moreover, the materials forming the front lens shell, the back lens shell and the separator may have refractive indices that are close to each other in order to avoid parasite light reflections.

In an example, the first cavity (201) may be filled with a first fluid and the second cavity may be filled with a second fluid.

The first fluid and the second fluid are different fluids, which have different optical properties. In particular, the first fluid and the second fluid may have different refractive indices, for example at least a 0.01 difference, possibly 0.05 or more, possibly 0.1 or more. In particular the first fluid and the second fluid may have different light absorption spectra, different tints.

The first fluid and the second fluid may be appropriately selected to each have refractive indices close to each other, as well as close to the refractive indices of the materials forming the separator (102), membrane, front shell and back shell.

In the first state, the first cavity (201) being filled with the first fluid and the second cavity (202) being filled with the second fluid, the optical article has a first optical function. The optical function comprises in particular a transmission function which is related to the absorption spectra of both fluids, to the absorption spectrum of the different components of the optical article, such as the membrane (200) and to the respective widths of both cavities (201, 202).

The optical function further comprises a dioptric function which is related to the refractive indices of both fluids, to the refractive indices of the different components of the optical article, such as the membrane (200), and to the shapes of the front and back surfaces of the front shell, of both sides (102a, 102b) of the separator (102), and of the front and back surfaces of the back shell.

Figure 2:
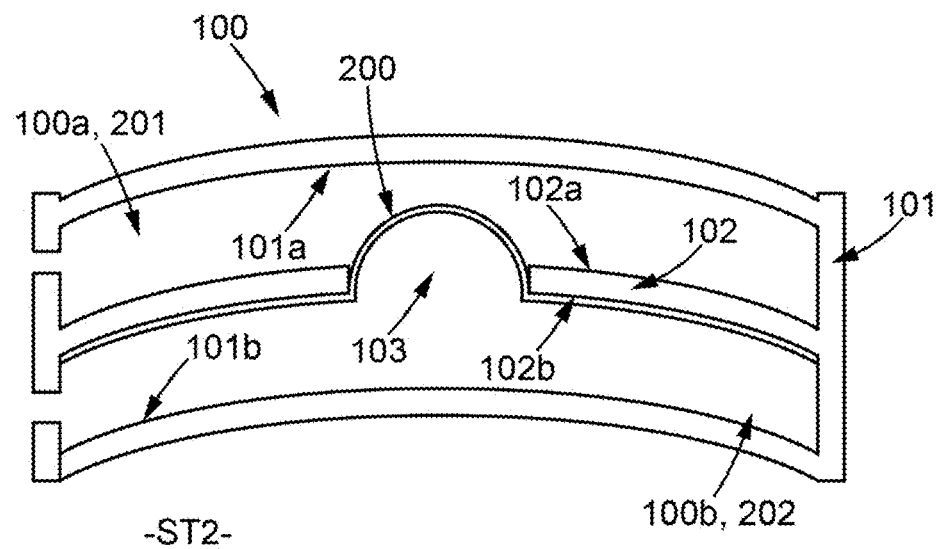

It is now referred to FIG. 2, which illustrates a second exemplary state of the optical article.

As illustrated in FIG. 2, the optical article may be set in a second state (ST2) in which the membrane (200) is maintained against the separator (102) on its whole surface except over the aperture (103), and in which the membrane (200) protrudes through the aperture (103).

The second state may correspond for example to a specific correction when reading for aging users with presbyopia, or to provide an additional optical power to help reducing myopia progression for children users.

Possibly, the optical article may allow additional near vision states that are intermediate, in terms of deformation of the membrane and of resulting optical function, between the first state as a default optical function and the second state corresponding to a near vision adjustment extremum. Such additional states may each correspond to adjustment increments of the optical function in near vision. The optical article may thus allow correcting, incrementally, an evolution of an ametropia in near vision, up to the near vision adjustment extremum.

Figure 4:
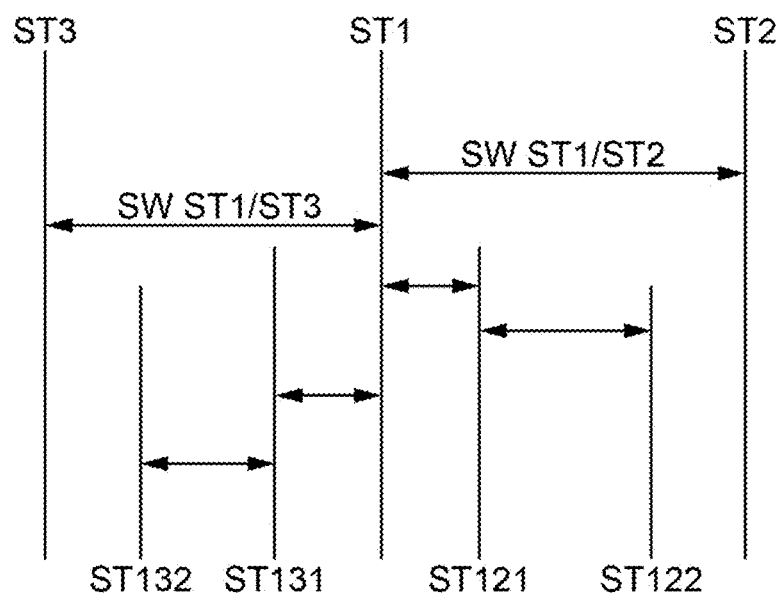
FIG. 4 depicts an example of a general flowchart of a method according to an embodiment, for controlling the optical equipment of FIGS. 1, 2 and 3.

It is now referred to FIG. 4 which illustrates different states of the optical article, in relation with an exemplary method for switching the optical article.

The method may comprise switching from one state to another. Switching SW ST1/ST2 the optical article from the first state (ST1) to the second state (ST2), or from the first state (ST1) to an additional near vision state (ST121, ST122), or from a first additional near vision state (ST121) to a second additional near vision state (ST122), or from an additional near vision state (ST121, ST122) to the second state (ST2), may be performed for example by controllably decreasing an amount of the first fluid filling the first cavity (201) and/or by controllably increasing an amount of the second fluid filling the second cavity (202). In order to passively maintain the same pressure in both cavities (201, 202), the deformable membrane (200) is thus deformed towards the first surface (101a) of the outer wall (101) of the hollow chamber (100). Since the membrane abuts against the separator (102) except over the aperture (103), a protrusion is necessarily formed through the aperture (103), the size of the protrusion being related to the respective amounts of fluid in the first cavity (201) and in the second cavity (202).

Of course, such switching is reversible by controllably increasing an amount of the first fluid filling the first cavity (201) and/or by controllably decreasing an amount of the second fluid filling the second cavity (202).

Figure 3:
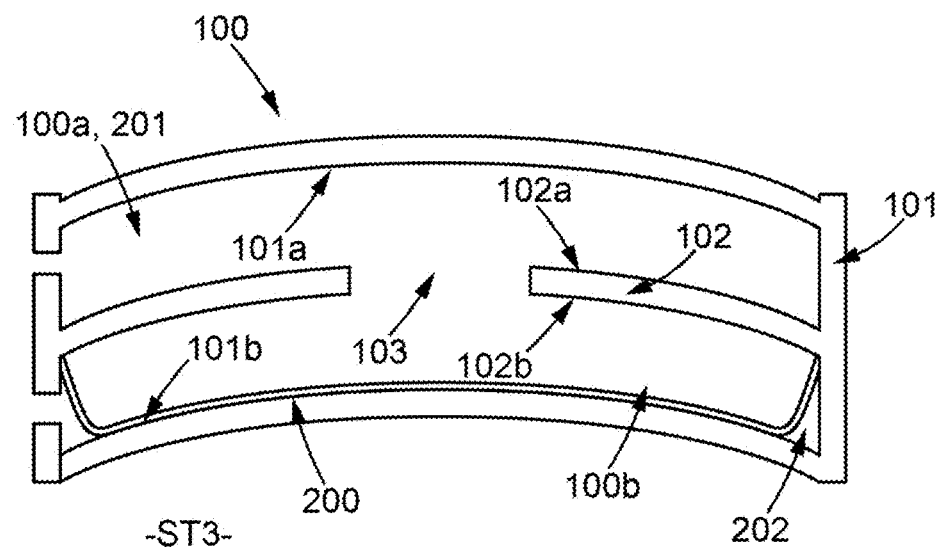

It is now referred to FIG. 3, which illustrates a third exemplary state of the optical article.

As illustrated in FIG. 3, the optical article may be set in a third state (ST3) in which the membrane (200) is lifted off the separator (102) and at least part of the membrane (200) is pressed against the second surface (101b) of the outer wall (101).

Possibly, the optical article may allow additional far vision states that are intermediate, in terms of deformation of the membrane and of resulting optical function, between the first state as a default optical function and the third state corresponding to a far vision adjustment extremum. Such additional states may each correspond to adjustment increments of the optical function in far vision. The optical article may thus allow correcting, incrementally, an evolution of an ametropia in far vision, up to the far vision adjustment extremum.

It shall be noted that in the additional far vision states, the deformation of the membrane is such that the membrane is neither pressed against the separator nor against the back lens shell. Rather, the deformation of the membrane, induced by the respective pressures of the fluids in both cavities is essentially spherical.

In the additional far vision states, the membrane (200) is lifted off the separator (102), though without being pressed against the second surface (101b) of the outer wall (101).

Switching SW ST1/ST3 the optical article from the first state (ST1) to the third state (ST3), or from the first state (ST1) to an additional far vision state (ST131, ST132), or from a first additional far vision state (ST131) to a second additional far vision state (ST132), or from an additional far vision state (ST131, ST132) to the second state (ST3), may be performed for example by controllably increasing an amount of the first fluid filling the first cavity (201) and/or by controllably decreasing an amount of the second fluid filling the second cavity (202). In order to passively maintain the same pressure in both cavities (201, 202), the deformable membrane (200) is thus deformed towards the second surface (101b) of the outer wall (101) of the hollow chamber (100), thus the surface of the membrane (200) delimited by the closed line is necessarily lifted off the separator (102). In the third state (ST3) which is extremal, the respective amounts of fluid in the first cavity (201) and in the second cavity (202) are such that the membrane (200) abuts against the second surface (101b) of the outer wall (101) and can't be further deformed.

Of course, such switching is reversible by controllably decreasing an amount of the first fluid filling the first cavity (201) and/or by controllably increasing an amount of the second fluid filling the second cavity (202).

The optical lens herein described allows switching between three different optical functions when the first cavity and the second cavity are each filled with a different fluid:
- in the first state (ST1), the optical lens may provide for example an optical function adapted for far vision over a wide angle,
- in the second state (ST2), the optical lens may provide for example an optical function adapted for near vision over a narrower angle, and
- in the third state (ST3), the optical lens may provide for example an optical function for far vision over a wide angle that differs from that provided in the first state.

For a hyperopic wearer, the optical function provided in the third state (ST3) corresponds to a more positive optical power than the optical function provided in the first state (ST1).

For a myopic wearer, the optical function provided in the third state (ST3) corresponds to a more negative optical power than the optical function provided in the first state (ST1).

The optical power difference between the first state (ST1) and the third state (ST3) far vision state are limited, but may apply up to a full field.

Indeed, as mentioned above, the membrane (200) is deformed in the third state across an area delimited by a closed line, and said closed line may extend to an area comprising a large surface of the second side (102b) of the separator (102), for example more than 50%, more than 75% or more than 90% and up to 100%.

The optical power difference between the first state (ST1) and the second state (ST2) may reach up to 3 diopters, thanks to the same membrane that is deformed in the opposite direction over a limited area. Indeed, as mentioned above, the membrane (200) is deformed in the second state across an area delimited by the aperture (103), and said aperture may represent a limited surface of the second side (102b) of the separator (102), for example less than 50%, less than 30%, or less than 10%.

It is now referred to another example of an optical lens, such as a spectacle optical lens that may be mounted on a spectacle frame. This other example of optical lens only differs from that depicted on FIG. 1 in that the separator (102) comprises a plurality of apertures (103) and in that the membrane (200) is attached, in the second subspace (100a), across a closed shape surrounding the plurality of apertures (103).

Figure 5:
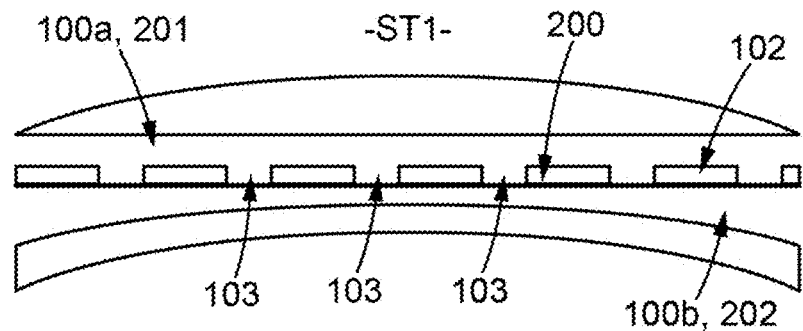
FIGS. 5, 6 and 7 depict three example states of a second example of optical equipment.
Figure 6:
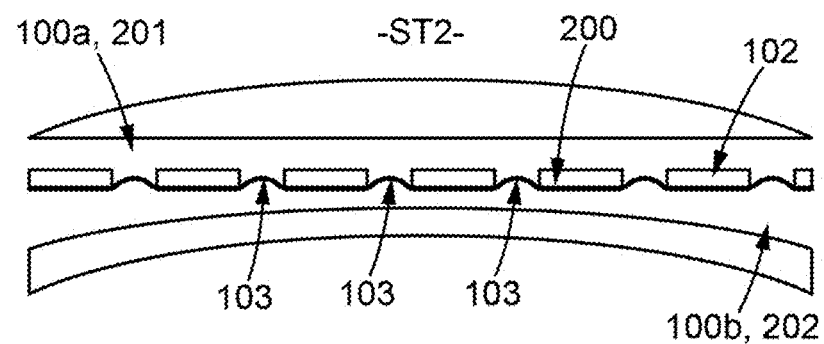
Figure 7:
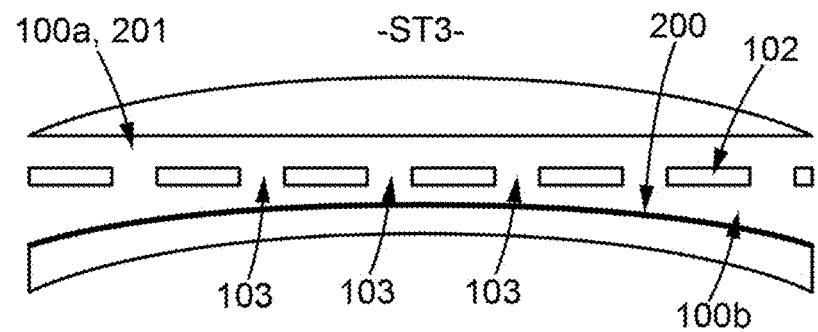

This other example of optical lens is also switchable between at least three different states or configurations. A first state (ST1) is depicted on FIG. 5, a second state (ST2) is depicted on FIG. 6 and a third state (ST3) is depicted on FIG. 7.

In the first state (ST1), the membrane (200) is maintained against the separator (102) and over the apertures (103), thus the first subspace (100a) coincides with the first cavity (201) and the second subspace (100b) coincides with the second cavity (202).

In the second state (ST2), the membrane (200) is maintained against the separator (102) and protrudes through each of the apertures (103), thus the second cavity (202) extends throughout the second subspace (100b) and part of the first subspace (100a).

The apertures (103) may be configured, in their sizes and shapes, so that when the first cavity (201) and the second cavity (202) are each filled with a different fluid, each protrusion behaves optically as a microlens.

Of course, to obtain such protrusions, it is required that the material forming the membrane (200) has, at least locally over the apertures (103), mechanical properties that allow protruding through said apertures (103).

From what precedes, the optical lens functionally comprises microlenses that are inactive in the first state (ST1) and activated in the second state (ST2).

Some types of repartition of microlenses over an optical lens field are known to allow providing an active function in order to prevent or reduce myopia progression. An appropriate correction is provided for near vision while also requiring accommodation from the user, which prevents an evolution of a myopia over time. This example is typically interesting for child users.

The repartition of the apertures (103) over the separator (102) may be chosen so that in the second state (ST2), the optical lens is adapted to prevent said evolution of myopia over time.

In the third state, the membrane (200) is released from the separator (102), thus the microlenses are also inactive and the optical function provided by the optical lens is different from the first state. Switching the optical lens between the first state, the third state, and possible intermediate states between the first and third states, may allow providing an appropriate correction for far vision.

EXAMPLES

A first optical lens configuration for a hyperopic wearer is described thereafter.

The lens is composed of a front shell and a back shell disposed so as to form a hollow chamber. The lens further comprises a separator separating the hollow chamber into a front subspace (towards the front shell) and a back subspace (towards the back shell). The lens further comprises a membrane attached to the side of the separator facing the back shell. The separator comprises an aperture as a channel between the front subspace and the back subspace. The membrane separates the hollow chamber into a first cavity filled with a first liquid and a second cavity filled with a second liquid.

Incoming light generally goes through the lens through the front shell, the first cavity, the separator, the membrane, the second cavity and the back lens shell in this order.

The front shell material, the first liquid, the separator and the membrane all have the same refractive index, which is equal to a first value $n_1$.

The back shell material and the second liquid have the same refractive index which is equal to a second value $n_2$ which is greater than $n_1$.

In practice, it is not possible to have exactly the same indices between materials and liquids, but it is important that they are chosen as close as possible to avoid undesired reflections, which would lower the image quality. For simplicity purposes, we will assume however, in this example, that these indices are exactly the same.

For clarity purposes, the surfaces of the front shell and of the rear shell will further be assumed to all be spherical, and the separator will be assumed to be planar. This configuration only allows providing purely spherical optical powers, such as corresponding to a spherical prescription value. An extension to cylindrical optical powers will be presented afterwards.

In the first state, the membrane rests on the separator and has a plane shape. Using a thin lens approximation, the optical power $P_1$ provided by the optical lens in the first state is a function of the curvature ci of the front shell, of the curvature $c_3$ of the rear shell, and of the first and second values of refractive indices $n_1$ and $n_2$, according to the equation $P_1=(n_1-1)c_1+(1-n_2)c_3$.

In the second state, the fluid pressure in the second cavity is increased with respect to the fluid pressure in the first cavity, which in turn induces a deformation of the membrane which thus protrudes through the aperture, the protrusion having a curvature $c_{22}$ which has a strictly positive value. Also using a thin lens approximation, the optical power $P_2$ provided by the optical lens over the aperture in the second state is a function of the curvature $c_1$ of the front shell, the curvature $c_{22}$ of the protrusion of the membrane through the aperture, of the curvature $c_3$ of the rear shell, and of the first and second values of refractive indices $n_1$ and $n_2$, according to the equation $P_2=(n_1-1)c_1+(n_2-n_1)c_{22}+(1-n_2)c_3$. Since in the second state the optical lens is intended to correct for near vision, $P_2$ is greater than $P_1$.

In the third state, the fluid pressure in the first cavity is increased with respect to the fluid pressure in the second cavity so as to remove most, or all, of the fluid contained in the second cavity. The membrane then rests on the back shell and has the same curvature $c_3$. Also using a thin lens approximation, the optical power $P_3$ provided by the optical lens in the first state is a function of the curvature ci of the front shell, of the curvature $c_3$ of the rear shell and of the membrane, and of the first and second values of refractive indices $n_1$ and $n_2$, according to the equation $P_3=(n_1-1)c_1+(n_2-n_1)c_3+(1-n_2)c_3$.

Based on the equations above, the optical lens, in particular the separator, the front lens shell and the rear lens shell, may be designed so that the curvatures $c_1$, $c_{22}$ and $c_3$ have specific values, based on predetermined values of $P_1$, $P_2$ and $P_3$ for a particular hyperopic wearer, such as:

$$c_1 = \frac{P_1(n_1-n_2)+(P_1-P_3)(n_2-1)}{(n_1-1)(n_1-n_2)}$$

$$c_{22} = \frac{P_1-P_2}{n_1-n_2}$$

$$c_3 = \frac{P_1-P_3}{n_1-n_2}$$

Therefore, the exemplary lens described above may provide:
- in the first state, a first optical power $P_1$, having a positive value, over a full field,
- in the second state, a second optical power $P_2>P_1$ over a narrow field, the first optical power $P_1$ elsewhere, and
- in the third state, a third optical power $P_3>P_1$ over the full field.

The first state may be used for example as a standard state for everyday use, the second state for near vision and the third state for a specific type of activity in far vision requiring an improved correction.

The same optical lens configuration may also be applied for an exemplary lens for a myopic wearer.

Alternatively, a second optical lens configuration may be adapted for an exemplary lens for a myopic wearer.

In particular, the membrane may be attached to the side of the separator facing the front shell rather than the back shell, and the separator may have the same refractive index $n_2$ as the second fluid rather than the first fluid. In this configuration, the curvature value $c_{22}$ of the membrane holds a negative value in the second state.

The formulas to calculate $P_1$ and $P_2$ are unchanged compared to the previously described configuration, thus $P_1=(n_1-1)c_1+(1-n_2)c_3$ and $P_2=(n_1-1)c_1+(n_2-n_1)c_{22}+(1-n_2)c_3$.

Only the formula to calculate $P_3$ is modified to $P_3=(n_1-1)c_1+(n_2-n_1)c_1+(1-n_2)c_3$.

In this configuration, as $c_2<0$ and with $n_1>n_2$, $P_2>P_1>P_3$.

Alternatively, by having one of the shell surfaces be toroidal rather than spherical, a cylindrical power such as corresponding to a cylindrical prescription value can be provided.

Considering the second optical lens configuration, and further considering that the back lens shell has a toroidal shape with a first curvature $c_3^1$ and a second curvature $c_3^2$, the different power values are as following:

$$P_1^1=(n_1-1)c_1+(1-n_2)c_3^1$$

$$P_2^1=(n_1-1)c_1+(n_2-n_1)c_{22}+(1-n_2)c_3^1$$

$$P_3^1=(n_1-1)c_1+(n_2-n_1)c_1+(1-n_2)c_3^1$$

$$P_1^2=(n_1-1)c_1+(1-n_2)c_3^2$$

$$P_2^2=(n_1-1)c_1+(n_2-n_1)c_{22}+(1-n_2)c_3^2$$

$$P_3^2=(n_1-1)c_1+(n_2-n_1)c_1+(1-n_2)c_3^2$$

The superscript denotes the meridian in which the power is calculated.

To obtain a specific prescription including a spherical optical power $P_1^1$, a cylindrical optical power $P_1^1+Cyl$ and a cylindrical axis, the previous relations become $$P_1^1=(n_1-1)c_1+(1-n_2)c_3^1$$

$$P_2^1=(n_1-1)c_1+(n_2-n_1)c_{22}+(1-n_2)c_3^1$$

$$P_3^1=(n_1-1)c_1+(n_2-n_1)c_1+(1-n_2)c_3^1$$

$$P_1^1+Cyl=(n_1-1)c_1+(1-n_2)c_3^2$$

$$P_2^1+Cyl=(n_1-1)c_1+(n_2-n_1)c_{22}+(1-n_2)c_3^2$$

$$P_3^1+Cyl=(n_1-1)c_1+(n_2-n_1)c_1+(1-n_2)c_3^2$$

The torus axis is simply set equal to the cylindrical prescribed axis.

It shall be noted that in the previous examples, the separator being planar, thus the interface between the two liquids in the first state also being planar, may lead to large optical aberrations if the front lens shell and the back lens shell are purely spherical or toroidal.

Figure 8:
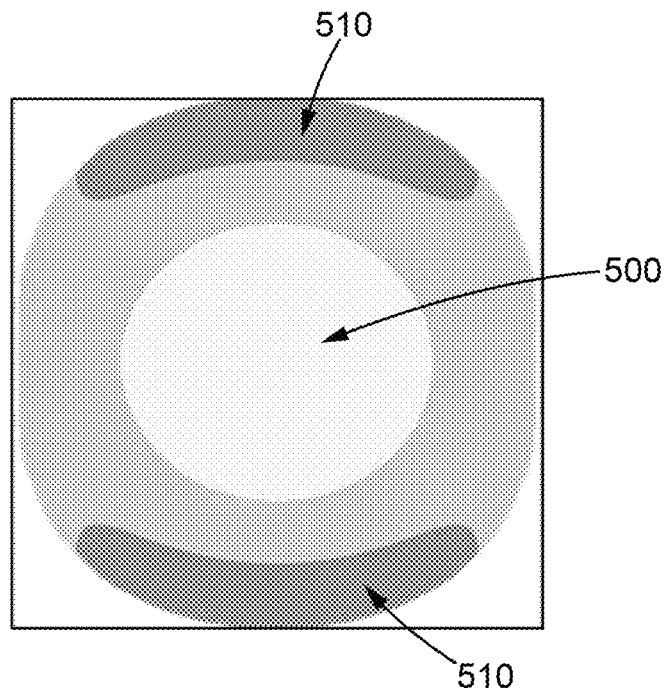
FIGS. 8 and 9 are maps of wearer power error over a cone of gaze directions for, respectively, an example of optical equipment having a toroidal back shell, and an example of optical equipment having a freeform back shell, both in a first state.
Figure 9:
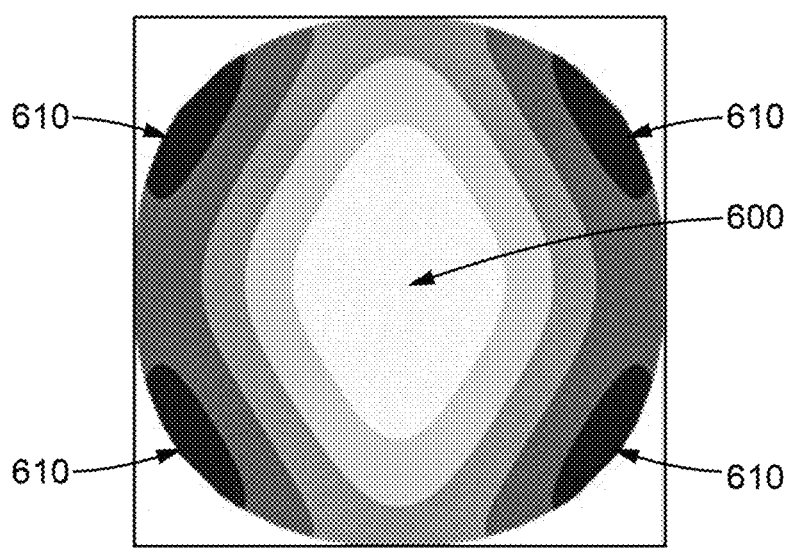

FIG. 8 depicts a map of wearer power error and FIG. 9 depicts a map of unwanted astigmatism for an exemplary optical lens according to the second optical lens configuration and a toroidal back lens shell, with the following numerical values: $n_1=1.55$, $n_2=1.45$, $P_1=-4$ diopters, $P_2=-2$ diopters, $P_3=-4.25$ diopters and the cylinder is equal to 2 diopters.

It can be seen on FIG. 8 that a central area 500 (in light grey) extending over about 30% of the surface of the exemplary optical lens exhibits an optical power error which is under 0.25 diopters, however, top and bottom areas 510 (in dark grey) exhibit an optical power error up to 1 diopter, which leads to an imperfect correction when gazing up or down.

More importantly, it can be seen on FIG. 9 that a central area 600 (in light grey) extending over about 20% of the surface of the exemplary optical lens exhibits an unwanted astigmatism which is under 0.25 diopters, while large values of unwanted astigmatism over 1 diopter are reached in peripheral areas 610 (in dark grey), which leads to a poor visual acuity in those regions.

This can be remedied by adding an appropriate freeform surface to either the front surface of the front shell, or to the back surface of the back shell.

To illustrate, an exemplary adapted optical lens is considered, with the back surface of the back shell having a freeform surface determined by using a non linear least squares optimization of the power error and of the unwanted astigmatism according to the following optimization problem:

$$\min_X f(X) = \sum_{(\alpha,\beta)\in K} [PowerError(X, \alpha, \beta)^2 + UnwantedAstigmatism(X, \alpha, \beta)^2]$$

K represents the set of all gaze directions of interest and X are the parameters of the freeform surface. For solving this optimization problem, many choices are acceptable.

Figure 10:
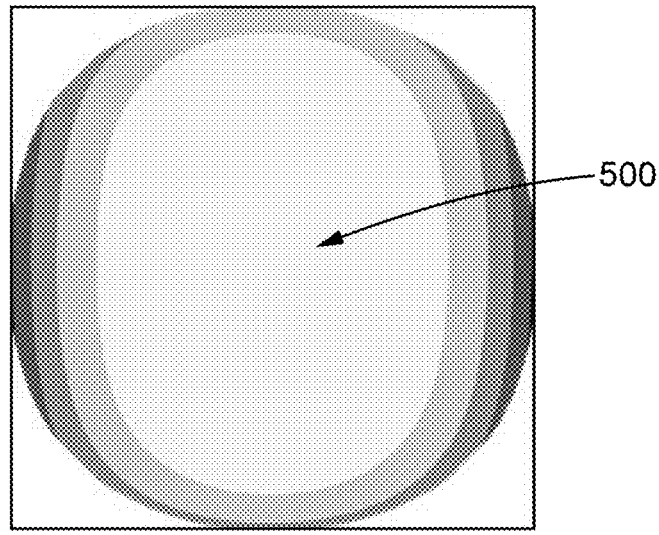
FIGS. 10 and 11 are maps of resulting astigmatism over a cone of gaze directions for said examples of optical equipments, both in said first state.
Figure 11:
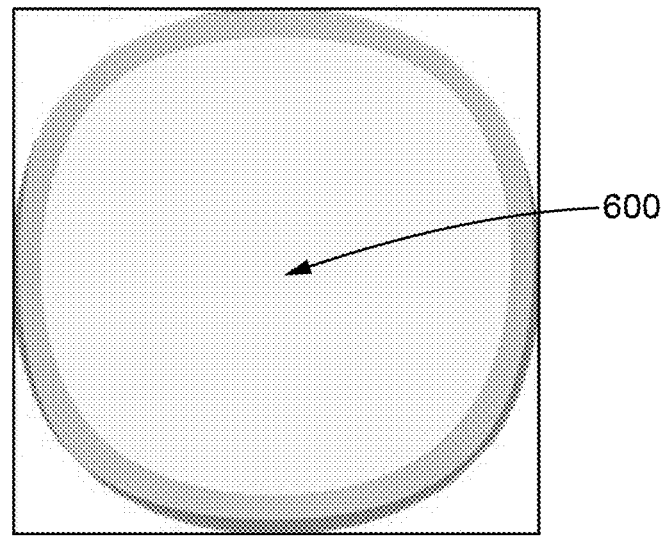

FIG. 10 depicts a map of wearer power error and FIG. 11 depicts a map of unwanted astigmatism for an exemplary optical lens according to the second optical lens configuration and a freeform back lens shell obtained by solving the above optimization problem using a Zernike layer of degree 7, with the following numerical values: $n_1=1.55$, $n_2=1.45$, $P_1=-4$ diopters, $P_2=-2$ diopters, $P_3=-4.25$ diopters and the cylinder is equal to 2 diopters.

It can be seen on FIG. 10 that the central area 500 of the optical lens (in light grey) exhibiting an optical power error below 0.25 diopters extends over 75% of the total surface of the optical lens.

It can further be seen on FIG. 11 that the central area 600 (in light grey) of the optical lens exhibiting an unwanted astigmatism below 0.25 diopters extends over 90% of the total surface of the optical lens.

It shall be noted that all the equations above are designed for configurations where the separator is planar. Of course the separator can alternatively be for example spherical and the membrane may be thermoformed to passively keep such spherical shape in the first state. With a spherical separator, more flexibility is allowable on the values of $c_1$ and $c_3$, also thinner lenses can be allowed.

The invention claimed is:

1. An optical article comprising:
   a hollow chamber delimited by an outer wall;
   a separator extending from the outer wall inwards, comprising a first side facing a first surface of the outer wall and a second side facing a second surface of the outer wall, the separator separating the hollow chamber into a first subspace and a second subspace,
   wherein the separator comprises an aperture; and
   a deformable membrane, attached, in the second subspace, along a closed line surrounding the aperture, the deformable membrane separating the hollow chamber into a first cavity extending towards the first surface of the outer wall and a second cavity extending towards the second surface of the outer wall,
   wherein the optical article is switchable, by deformation of the membrane, between at least three states,
   the first cavity being filled with a first fluid having a first optical property and the second cavity being filled with a second fluid having a second optical property, the optical article has a different optical function for each of the at least three states, wherein the optical article is further configured to be switched, by deformation of the membrane, between two of the at least three states, said two of the at least three states include a first state wherein the deformable membrane is pressed against the second side of the separator such that the membrane extends across the aperture in the extension of the separator, and wherein the separator is non-planar and the membrane is thermoformed to passively keep the shape of the separator in the first state, providing a reference optical function related to the shape of the separator and based on a prescription value of a user.

2. The optical article according to claim 1, wherein the separator and the outer wall are non-deformable.

3. The optical article according to claim 1, wherein the outer wall comprises a fluid inlet linked to the first subspace for adjusting an amount of fluid inside the first cavity to deform the membrane to switch the active optical function from one state to another.

4. The optical article according to claim 1, wherein the outer wall comprises a fluid inlet linked to the second subspace for adjusting an amount of fluid inside the second cavity to deform the membrane to switch the active optical function from one state to another.

5. The optical article according to claim 1, wherein in a second state the deformable membrane protrudes through the aperture such that the second cavity extends to part of the first subspace.

6. The optical article according to claim 5, wherein in a third state at least part of the deformable membrane is lifted off the separator such that the first cavity extends to at least part of the second subspace.

7. The optical article according to claim 1, wherein the at least part of the deformable membrane has an area larger than the aperture.

8. The optical article according to claim 6, wherein in the third state at least part of the deformable membrane is pressed against the second surface of the outer wall.

9. The optical article according to claim 1, wherein the optical article is an optical lens comprising a front shell and a back shell and wherein the hollow chamber is formed between the front shell and the back shell.

10. The optical article according to claim 1, wherein, the first cavity being filled with the first fluid and the second cavity being filled with the second fluid, the optical article has a first optical power P1 in the first state and a second optical power P2 in a second state with P2−P1 having an absolute value greater than 0.25 diopters.

11. The optical article according to claim 1, wherein, the first cavity being filled with the first fluid and the second cavity being filled with the second fluid, the optical article has a first optical power P1 in the first state and a third optical power P3 in a third state with P3−P1 having an absolute value greater than 0.25 diopters.

12. The optical article according to claim 1, wherein the separator comprises a plurality of apertures and the membrane is attached, in the second subspace, across a closed shape surrounding the plurality of apertures.

13. A method for switching an optical article between a plurality of states, the optical article comprising:

a hollow chamber delimited by an outer wall, a separator extending from the outer wall inwards, comprising a first side facing a first surface of the outer wall and a second side facing a second surface of the outer wall, the separator separating the hollow chamber into a first subspace and a second subspace, the separator comprising an aperture, a deformable membrane, attached, in the second subspace, along a closed line which surrounds the aperture, the deformable membrane separating the hollow chamber into a first cavity extending towards the first surface of the outer wall and a second cavity extending towards the second surface of the outer wall, the optical article being switchable, by deformation of the membrane, between at least three states, the first cavity being filled with a first fluid having a first optical property and the second cavity being filled with a second fluid having a second optical property, the optical article has a different optical function for each of the at least three states, the method comprising switching the optical article between two of the at least three states by deforming the membrane, wherein said two of the at least three states include a first state wherein the deformable membrane is pressed against the second side of the separator such that the membrane extends across the aperture in the extension of the separator, and wherein the separator is non-planar and the membrane is thermoformed to passively keep the shape of the separator in the first state, providing a reference optical function related to the shape of the separator and based on a prescription value of a user.

14. The optical article according to claim 1, wherein the optical article provides a reference optical function in the first state, the reference optical function being related to a shape of the separator and the reference optical function being based on a prescription value of a user.

15. The method according to claim 13, wherein the optical article provides a reference optical function in the first state, the reference optical function being related to a shape of the separator and the reference optical function being based on a prescription value of a user.

16. The optical article of claim 1, wherein the optical functions provided in the second and third states are configured to correct different visual conditions, with the first state adapted for an intermediate vision task, the second state adapted for a near vision task and the third state is adapted for a far vision task.

17. The optical article according to claim 1, wherein the second cavity is free of any additional separator.

18. The optical article of claim 17, wherein in the second state, the membrane protrudes through the aperture to form a lens adapted to prevent myopia progression by requiring active accommodation from the user.

19. The optical article of claim 18, wherein in the third state at least part of the deformable membrane is pressed against the second surface of the outer wall.

20. The optical article of claim 17, wherein the optical functions provided in the second and third states are configured to correct different visual conditions, with the first state adapted for an intermediate vision task, the second state adapted for a near vision task and the third state is adapted for a far vision task.

* * * * *